No. 685,771. Patented Nov. 5, 1901.
F. J. LANGER.
ADVERTISING DEVICE.
(Application filed Jan. 19, 1901.)
(No Model.) 4 Sheets—Sheet 1.

ATTEST
R. B. Moser
M. A. Sheehan

INVENTOR
FRIEDERICH J. LANGER
BY H. V. Fisher
ATTY

No. 685,771. Patented Nov. 5, 1901.
F. J. LANGER.
ADVERTISING DEVICE.
(Application filed Jan. 19, 1901.)
(No Model.) 4 Sheets—Sheet 2.
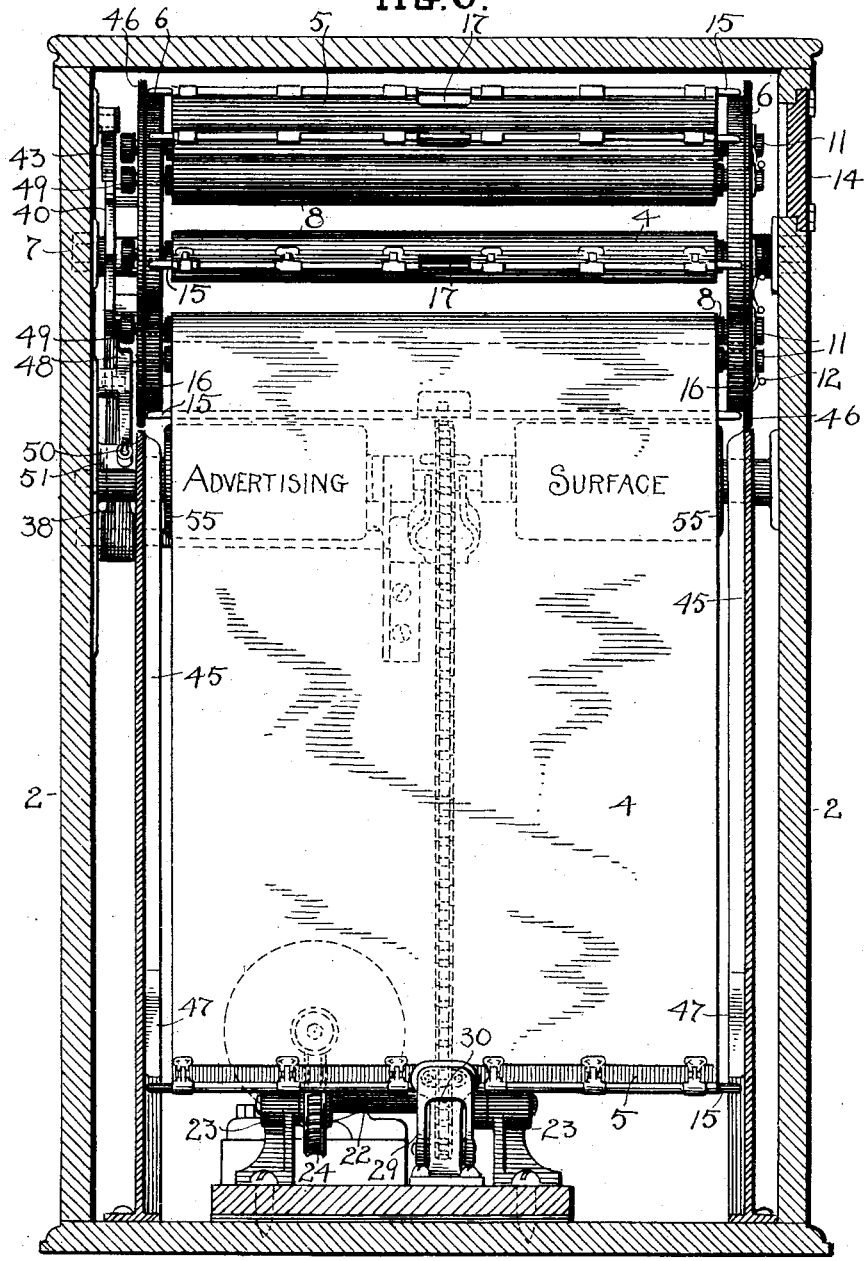
ATTEST
R. B. Moore
M. A. Sheehan
INVENTOR.
FRIEDERICH J. LANGER
By W. T. Fisher
ATTY No. 685,771. Patented Nov. 5, 1901.
F. J. LANGER.
ADVERTISING DEVICE.
(Application filed Jan. 19, 1901.)
(No Model.) 4 Sheets—Sheet 3.
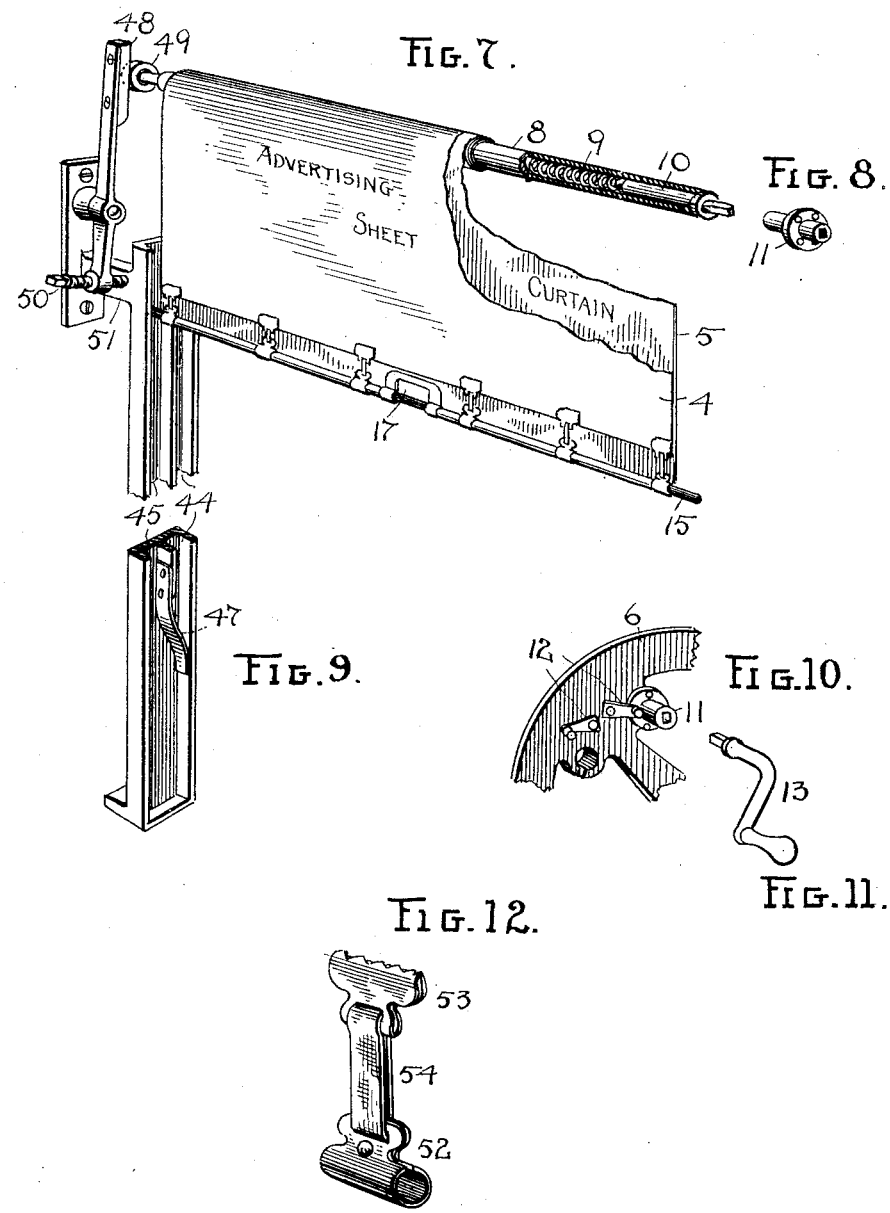

No. 685,771. Patented Nov. 5, 1901.
F. J. LANGER.
ADVERTISING DEVICE.
(Application filed Jan. 19, 1901.)
(No Model.) 4 Sheets—Sheet 4.
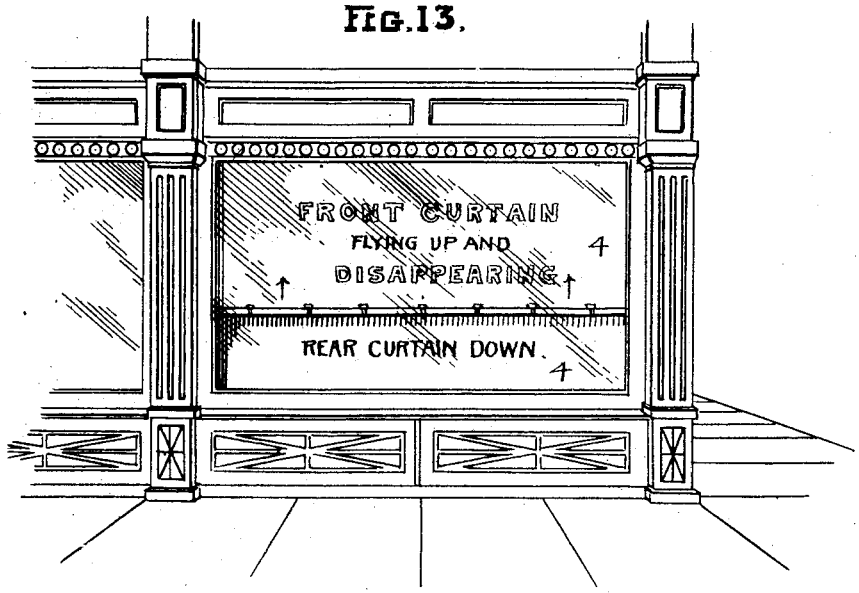
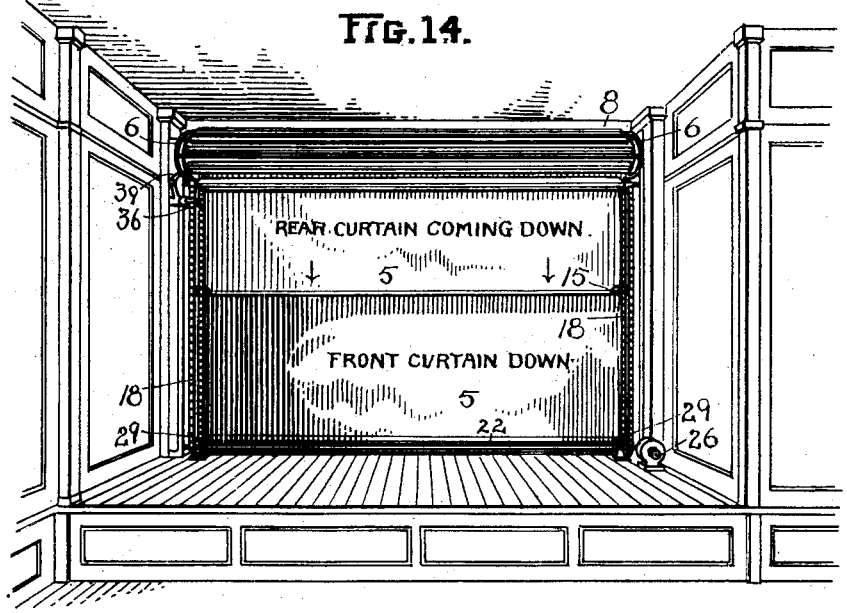
ATTEST.
INVENTOR.
FRIEDERICK J. LANGER.
By H. V. Fisher ATTY

UNITED STATES PATENT OFFICE.

FRIEDERICH J. LANGER, OF CLEVELAND, OHIO.

ADVERTISING DEVICE.

SPECIFICATION forming part of Letters Patent No. 685,771, dated November 5, 1901.

Application filed January 19, 1901. Serial No. 43,885. (No model.)

*To all whom it may concern:*

Be it known that I, FRIEDERICH J. LANGER, a citizen of the United States, residing at Cleveland, in the county of Cuyahoga and State of Ohio, have invented certain new and useful Improvements in Advertising Devices; and I do declare that the following is a full, clear, and exact description of the invention, which will enable others skilled in the art to which it appertains to make and use the same.

My invention relates to advertising devices, and is an improvement in that class of devices wherein a changeable advertising front is caused to appear and disappear before the eyes of an observer; and the improvement consists in the construction and arrangement of parts, all substantially as hereinafter described, and more particularly pointed out in the claims.

One of the main objects of this invention is to produce an instantaneous change of advertising matter at intervals, which change is effected by hidden means and methods in order to attract and mystify the observer, and thus hold his attention while a large area of advertising-space is caused to appear before him.

Another object of importance is embraced in the construction which enables me to present a series of advertising-spaces single and successively, which spaces in the aggregate cover a large area and when not displayed occupy a limited amount of room.

This device can be used in various places and under many conditions. For example, the device can be placed within a casing or cabinet and made transportable, so that a display can be made from place to place, or the casing can be dispensed with in part or entirely and the device proper be attached to a store show-window to take the place of the ordinary single curtain or shade. In the latter case the merchant can utilize my device to attract the attention of the passer-by, and thus advertise his wares while his show-window is being dressed behind the curtains.

Figure 1:
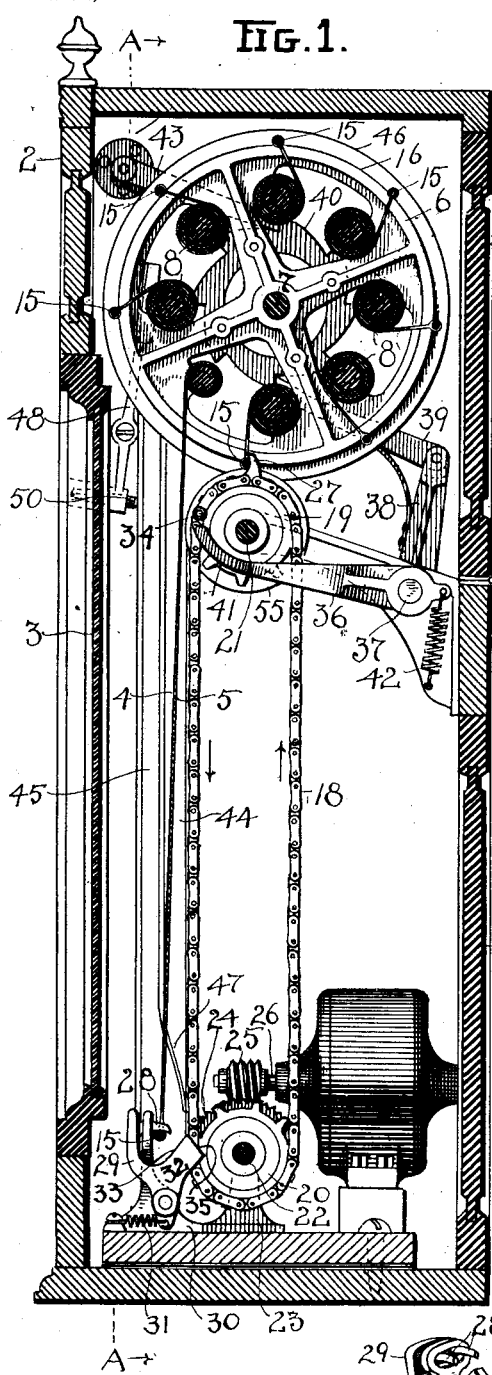
Figure 2:
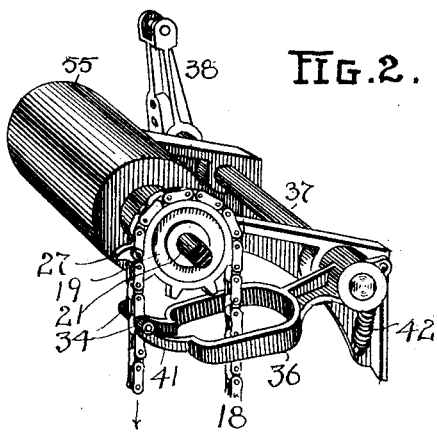
Figure 3:
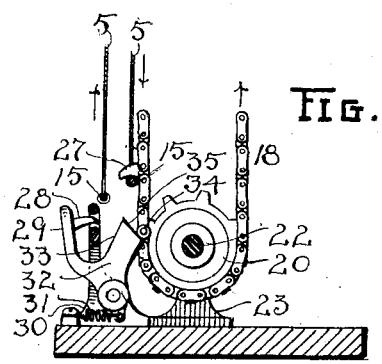
Figure 4:
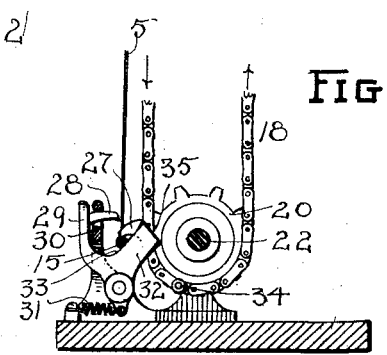
Figure 5:
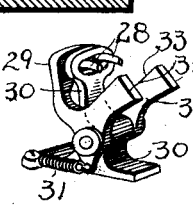

In the accompanying drawings, Figure 1 represents a central sectional side elevation of my improved device, showing a curtain down and in view from the front and a second curtain about to be carried down behind the first one. Fig. 2 is a detail perspective view of the mechanism by means of which the curtain-roller-carrying wheels are rotated. Fig. 3 is a detail view of the catch-and-trip mechanism located at the bottom of the cabinet and showing the first curtain released and flying upward as the second curtain is about at the end of its downward travel. Fig. 4 is a similar view to Fig. 3, but showing a curtain in the act of being shifted from the chain-hook to the trip catches or hooks, which hooks will then hold said curtain down and in view until released. Fig. 5 is a perspective view of the curtain releasing and detaining trip and catch. Fig. 6 is a sectional view of the cabinet or casing on line A A, Fig. 1, showing a front elevation of the device with a curtain down as in Fig. 1. Fig. 7 is a perspective view of a single curtain partly unrolled and having the separate advertising-sheet attached to its front face, both the curtain and sheet being broken away to disclose a section of the spring-controlled roller. The brake and a part of the guiding grooves or ways are also shown in this figure. Fig. 8 is a perspective view of a sleeve member for supporting the end of a curtain-roller and by means of which the tension of the roller-spring is adjusted and maintained. Fig. 9 shows a perspective view of the lower end of the curtain-guiding grooves or ways and the switch therefor. Fig. 10 is a perspective view of a portion of one of the curtain-roller-carrying wheels, showing one of the sleeve members for supporting a roller in place thereon; and Fig. 11 is a detail view of the handle for rotating said member. Fig. 12 is a perspective view of a clasp and elastic fastener for attaching the advertising-sheet to the bottom of the curtain. Fig. 13 is an exterior view of a show-window, illustrating the action of the curtains of my improved device as adapted thereto. Fig. 14 is an interior view of the window shown in Fig. 13, showing more clearly the modified arrangement of the driving mechanism.

Now, referring again to the drawings, 2 represents a casing or cabinet having a glass door 3 at its front, through which the sheets 4 or curtains 5, upon which the advertising matter is printed, can be seen, and the means and mechanism for supporting and operating the curtains 5 are all located within this cabinet.

The form of this casing or cabinet is not material. In fact, in some instances it may be dispensed with entirely when suitable supports for the curtain-roller-carrying wheels and driving mechanism be substituted.

The curtain-roller-supporting wheels 6 are rigidly mounted on a shaft 7, having bearings arranged at the sides and top of the casing 2, and the curtain-rollers 8—in this instance eight in number, although more or less can be used—are supported on said wheels at an equal distance apart and in radial lines about shaft 7. Each roller 8 is provided with a coiled spring 9, inclosed therein and having one end fastened thereto, the other end of the spring being fastened to a flat-sided or angular-ended extension member 10, upon which the roller is free to rotate and by which the spring tension is adjusted and held. The flattened or angular end of extension 10 rests in an angular bore of a sleeve member 11, having a rotatable bearing in wheel 6 at the right, and a flat spring 12, mounted on the face of said wheel, bears against the face of a flange on said member 11 and keeps it in place. This spring has a locking-pin on its free end, which normally rests in one of the holes in said flange and prevents member 11 and its engaging roller extension 10 from turning. When the tension of spring 9 is to be changed, a handle 13, having a flattened or angular end corresponding to the bore of sleeve 11, is inserted through door 14 at the upper right-hand corner of the cabinet and placed in engaging position within said sleeve. Spring 12 is then pushed to one side of the sleeve-flange, and after the required rotation is given to wind up coiled spring 9, the flat spring is again placed upon the face of the flange in locking position.

Each curtain 5 is provided with a rod 15 at its bottom edge, which extends a slight distance beyond the sides of the curtains, and these rod extensions rest upon the ledge or rim 16 of wheels 6 when springs 9 wind up the rollers. This engagement of rods 15 and ledges 16 serves to hold the curtain and its roller fixed when extra tension is to be given spring 9, as hereinbefore described, and also serves to normally keep said rod a certain distance away from the roller 8 at a point on ledges 16 where engagement can be made with rod 15 centrally between its ends, as provided for by opening 17 in the bottom edge of each curtain, in order to draw the curtain down at the proper time.

The mechanism for drawing the curtains 5 down against the tension of springs 9 comprises an endless sprocket-chain 18, carried by sprocket-wheels 19 and 20, arranged in a vertical line substantially below the vertical center of wheels 6. The upper sprocket-wheel 19 is mounted centrally upon a cross-shaft 21, supported at its ends in suitable bearings on the sides of the cabinet, and the lower sprocket-wheel 20 is supported on a short shaft 22, having bearing in standards 23, mounted on a base-board at the bottom of the cabinet. Power is applied to shaft 22 to drive the sprockets and chains through a gear 24, meshing with and driven by a worm-gear 25 on the end of the motor-shaft 26. An electric motor is here shown as the source of power; but any other suitable driving means may be utilized.

Each curtain 5 is unrolled and displayed in succession, and the unrolling or drawing down of each curtain is accomplished by means of a catch or lug 27, formed on one of the links of chain 18. The location of shaft 21 and its sprocket-wheel 19 is in such close proximity to the curtain-rods 15, as defined by wheel-ledges 16, that as the catch 27 is carried around the periphery of sprocket-wheel 19 it will engage rod 15 at opening 17. Then as the chain continues its travel the catch grips rod 15 and carries it and its curtain 5 down to the bottom of the cabinet, where it is then released from catch 27 and shifted to a second detaining double hook 28 independent of the chain. This detaining double hook is part of a combined detaining and releasing member 29, which is pivotally mounted on an upright arm 30, fastened to the base-board, and a coiled spring 31, attached to member 29 below its pivot and to the bottom of arm 30, serves to keep member 29 and its hooks 28 in position to receive and hold rod 15 when said rod is released from catch 27. This release is effected by means of arms 32 on member 29, which extend inward and at either side of chain 18 and its catch 27, and said arms have inner inclines 33, against which rod 15 strikes and rides upon to force said rod to the front under hooks 28 and out of engagement with catch 27, which catch is caused to travel away from arms 32 by passing around lower sprocket-wheel 20, as shown in Fig. 4. The curtain is now held in lowered position by hooks 28 and remains so for a predetermined period of time, which is dependent upon the location of a set of releasing-pins 34, fastened to the side of chain 18. In this instance the pins 34 are located at a point on the chain slightly in advance of catch 27, and in order to effect a release of the curtain-rod from hooks 28 it is necessary for the chain to make substantially a complete circuit before pins 34 come in contact with member arms 32. These arms are provided with inclined edges 35 at their upper and outer edges and are normally in position at the side of the sprocket-chains to be engaged by pins 34 to throw members 29 back and withdraw hooks 28 from curtain-rod 15, as clearly seen in Fig. 3. The release of the rod from hooks 28 is further aided by upright arm 30, through which the hooks project and which prevents the rod from following back with the hooks.

One of the advantages in having pins 34 and catch 27 closely placed consists in the effect produced by the movement and relation of the two curtains actuated. Thus it will be seen that the first or front curtain held by hooks 28 is not released until the second curtain, which is to take its place, has been carried to the bottom behind the same, and to all appearances from without it cannot be seen just how the change has been effected, which fact, taken in connection with the rapid and instantaneous rise of the first curtain, serves to attract and mystify the observer. Furthermore, at no time during the operation of the device can anything be seen taking place behind the curtains, and this feature is especially desirable where the device is applied to show-windows, because it allows the window-dressers to prepare their window in secret without exposing their preparatory work and plans to the public. The benefit and advantage to the merchant in the application of this feature lies in the continuous advertising he derives from the moving and changing advertising-curtains while the work within is progressing and his show-front instead of being a dead-front now becomes a moving and attractive advertising medium.

Referring back to the relation of catch 27 and pins 34, another advantage in thus arranging them consists in the unity of their operation when they are passing around the upper sprocket-wheel 19. It is here where the catch 27 grips a new rod 15 and begins to carry the attached curtain down, and as this occurs pins 34 on the traveling chain are utilized to actuate mechanism to rotate wheels 6, and thus carry the curtain just gripped to the front and substantially parallel to the chain, as well as advancing all the curtain-rollers on the wheels 6 a step in their circular travel. The curtain in advance of the one just gripped and which is always down at this time, as seen in Fig. 1, is thus caused to move away from chain 18 toward the front of the cabinet, thereby making room for the curtain coming down behind it. The roller 8 and curtain thereon located to the rear of the one gripped is also brought forward by this movement to the point just vacated by the gripped curtain and remains in this position to be gripped and carried down in its turn when catch 27 completes its circuit.

The actuating mechanism referred to for rotating wheels 6 comprises a bifurcated arm 36, its shaft 37, arm 38 on said shaft, and a spring-pressed pawl 39, pivoted at the upper end of arm 38. Shaft 37 is supported in brackets located at the rear of the cabinet. Pawl 39 engages a ratchet-wheel 40, fastened to the side of wheel 6 at the right, and rotates wheels 6 a distance equal to the distance between the centers of two curtain-rollers whenever pins 34 engage and carry down the ends 41 of arm 36. This arm has the ends 41 arranged to come within close working distance to the sides of chain 18 at the front, where pins 34 can strike the same when coming down, but are spread more apart opposite the chain at the rear in order that pins 34 may pass by in their upward travel. A spring 42, attached to the supporting-bracket and the short end of arm 36, holds and returns said parts to their normal position, as shown in Fig. 1. A dog 43, pivotally supported within the upper end of the cabinet, engages ratchet-wheel 40 and holds wheels 6 from any back movement.

To assure a more direct line of travel for the curtains that are drawn down or released to fly up, so that no interference or rubbing between the two is had, I provide tracks or grooved ways 44 and 45 for each curtain at each side of the cabinet and at the immediate ends of rods 15. The inner faces of these tracks are flush with the inner face of a flange 46, formed at right angles to rim 16 on wheels 6, and these faces serve to guide the curtains in a straight line to roll uniformly on their rollers. As each curtain is carried down the ends of rods 15 ride in grooves 44, and when said rod is shifted from catch 27 to hooks 28 the ends of the rod are also caused to shift into grooves 45 by passing by the lower or free end of a spring or other suitable switch-tongue 47, that normally keeps the lower end of grooves 44 closed. Then when the curtain is released to fly up the ends of rod 15 guide the curtain along a new line of travel by means of grooves 45. Upon shaft 21, at either side of the sprocket-wheel 19, are rollers 55, which are free to rotate thereon and which are of somewhat greater diameter than sprocket-wheel 19. The faces of these rollers are of such width as to form a smooth bearing and rolling surface for curtain 5 as it is drawn down, and they serve to keep the curtain out of contact with the sprocket-wheel 19 and chain 18.

Where the spring tension of the rollers 8 is necessarily of great power, as in heavy and large curtains, a friction-brake 48 is used to check the too-rapid rotation of the roller. This is accomplished by means of a small band-wheel 49 on the end of each roller-trunnion, which as wheels 6 are rotated come into frictional engagement with brake 48 before the release of the curtain is effected. The rise of the curtain can now be regulated by the degree of friction applied, which is set by means of a screw 50, that screws through the lower end of the brake-arm below its pivot and bears against the supporting-bracket 51.

It is exceedingly desirable that the advertisements to be used be printed or otherwise made upon separate sheets of cheaper material than that of the curtains and attachable thereto, so that they can be changed as often as desired at slight expense. The curtains being of tough durable linen, a firm backing is obtained for the advertising-sheets, which sheets 4 are fastened in place upon curtains 5 in any suitable manner. The preferred way is by laying a sheet 4 upon the unrolled curtain 5 and allowing the upper end of the sheet to roll in with that part of the winding curtain that remains normally wound thereafter, the curtain when in use being adjusted to unroll only a fixed distance or length, which length remains the same at all times. The lower end of sheet 4 is attached to rod 15 or curtain 5 by means of a clamping device, which in this instance comprises clamp 52 and clasp 53, connected and held together by an elastic band 54. Clamp 52 attaches to rod 15 and clasp 53 to the bottom edge of paper sheet 4, and the elastic band 54 takes up the slack in sheet 4 as the curtain and sheet roll up together and prevents wrinkling of the sheet. In unrolling the curtain the elastic band relieves the pull on the sheet where fastened and prevents it from tearing the sheet. Six of these fasteners are shown; but more or less can be employed, as occasion requires, and although the style and form here shown and described are effective and practical nevertheless I do not wish to limit myself to this particular form or style of attachment for the sheet and curtain.

In Figs. 13 and 14 a slightly-different arrangement of the driving mechanism is shown. Here two chains 18 are used, one at each side of the curtains, the detaining and releasing parts 29 being merely duplicated to carry out this change. This double arrangement places the driving-chains at one side and out of view when the curtains are all raised and at rest. If a single chain were used for a show-window device, the central location of the chain would necessitate its removal when all the curtains were raised and the device was not in use.

What I claim is—

1. An advertising device comprising a plurality of curtains arranged in series and mounted on rollers, a traveling catch to grip and unroll each curtain, and means to bring each curtain to engaging position with said catch at successive intervals, substantially as described.

2. An advertising device comprising a plurality of curtains arranged in series and mounted on spring-controlled rollers, traveling grip mechanism to unroll said curtains singly and successively, and means to carry each curtain into engagement with said mechanism, substantially as described.

3. A plurality of roller-curtains and a movable support therefor, means to actuate said support to bring said curtains forward successively, a traveling catch to unroll said curtains, a detaining device to hold said curtains in unrolled position, and a traveling trip to release said curtains from said device, substantially as described.

4. The series of roller-curtains and a movable support therefor, a traveling catch to unroll said curtains, detaining mechanism for the unrolled curtains, and means to actuate said support to bring each curtain forward in line with said catch, substantially as described.

5. In an advertising device, a series of curtains and spring-controlled rollers therefor, movable supports for said rollers and curtains, a traveling catch to unroll each curtain in succession, a detaining device and releasing mechanism for the unrolled curtains, and means to actuate said movable supports to bring each curtain forward when engaged by said traveling catch, substantially as described.

6. A plurality of curtains mounted on rollers, a rotatable support for said rollers, an endless chain and catch thereon to engage each curtain and unroll the same, actuating mechanism for said support having operating-arms, and pin projections on said chain to engage said arms, substantially as described.

7. A support having a series of rollers mounted thereon, curtains for said rollers, a traveling catch to unroll said curtains at successive intervals, trip mechanism to release said curtains from said catch, and springs to wind up said curtains on their rollers, substantially as described.

8. A rotatable support having a series of rollers and springs therefor mounted thereon, curtains for said rollers, an endless chain having a catch to unroll said curtains at successive intervals, pins on said chain and operating-arms engaging therewith to actuate said rotatable support to bring each roller forward in succession, and a combined trip and detaining device for said curtains in line with and actuated by said pins, substantially as described.

9. A rotatable support having a series of spring-controlled rollers mounted thereon, curtains for said rollers, means to rotate said support to bring each roller forward, a traveling chain and catch thereon to unroll each curtain in succession, a detaining device to hold the unrolled curtain, and releasing mechanism to disengage said curtains from the detaining device, substantially as described.

10. A rotatable support having a series of spring-controlled rollers mounted thereon, curtains for said rollers, a traveling catch to unroll said curtains in succession one behind the other, and traveling pins and operating-arms engaging therewith to rotate said support, substantially as described.

11. A plurality of spring-controlled rollers having curtains mounted thereon, a moving support for said rollers, an endless chain and mechanism operated thereby to actuate said support at intervals to bring a single roller and its curtain forward, a catch on said chain to carry each curtain down to expose its face, and mechanism to catch and hold each curtain down until its successor is carried down behind it, substantially as described.

12. A plurality of curtains mounted on spring-controlled rollers and a support therefor, rods for said curtains extending at each side thereof, a traveling catch to engage and carry each rod and its curtain to unrolled position, means to hold said curtains in unrolled position for an interval, and grooved ways for said rod extensions to guide said curtains in their travel, substantially as described.

13. The movable support and the spring-controlled rollers thereon, curtains for said rollers, means to unroll and mechanism to release said curtains, a friction-brake for said rollers, and means to actuate said support to bring the roller of the unrolled curtain into engagement with said brake before said curtain is released, substantially as described.

14. In an advertising device, a plurality of roller-curtains, an endless chain and a catch thereon to unroll said curtains in consecutive order one behind the other, a combined trip and detaining device for the unrolled curtains, and projecting members on said chain arranged in advance of the catch thereon whereby said device is actuated to release the curtain held thereby after the one behind has been substantially unrolled, substantially as described.

15. The spring-controlled rollers and curtains therefor, and an endless chain having a catch to grip and unroll said curtains, in combination with a pivoted member having detaining-hooks for said curtains, inclined arms on said member to shift said curtains from the chain-catch to said hooks, and means to release said curtains from said hooks, substantially as described.

16. In an advertising device, the spring-controlled rollers having curtains mounted thereon, a rotatable support for said rollers, an endless chain having a catch to grip and carry the curtains down, pins in said chain, ratchet mechanism having an operating-arm to engage said pins whereby said support is rotated, and a combined trip and detaining device having reverse inclines whereby the curtains are released from said catch and then released from said detaining device, substantially as described.

17. The spring-controlled rollers having curtains thereon, an endless chain having a catch to unroll said curtains, and side projecting pins on said chain, in combination with a pivoted member having detaining-hooks for said curtains, inclined arms on said member whereby said curtains are shifted from said catch to said hooks, and reversely-inclined portions on said arms adapted to be engaged by said pins to tilt said member on its pivot and thereby release said curtains from said hooks, substantially as described.

Witness my hand to the foregoing specification this 8th day of January, 1900.

FRIEDERICH J. LANGER.

Witnesses:
M. A. SHEEHAN,
R. B. MOSER.